United States Patent
Ma et al.

(10) Patent No.: US 11,562,278 B2
(45) Date of Patent: Jan. 24, 2023

(54) QUANTUM MACHINE LEARNING ALGORITHM FOR KNOWLEDGE GRAPHS

(71) Applicant: Siemens Aktiengesellschaft, Munich (DE)

(72) Inventors: Yunpu Ma, Munich (DE); Volker Tresp, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 918 days.

(21) Appl. No.: 16/414,065

(22) Filed: May 16, 2019

(65) Prior Publication Data
US 2020/0364599 A1 Nov. 19, 2020

(51) Int. Cl.
| | |
|---|---|
| G06N 10/00 | (2022.01) |
| G06N 20/00 | (2019.01) |
| G06F 17/18 | (2006.01) |
| G06N 5/02 | (2006.01) |
| G06N 5/04 | (2006.01) |

(52) U.S. Cl.
CPC .............. *G06N 10/00* (2019.01); *G06F 17/18* (2013.01); *G06N 5/02* (2013.01); *G06N 5/04* (2013.01); *G06N 20/00* (2019.01)

(58) Field of Classification Search
CPC .......... G06N 10/00; G06N 20/00; G06N 5/02; G06N 5/04; G06F 17/18
See application file for complete search history.

(56) References Cited

U.S. PATENT DOCUMENTS

| | | | |
|---|---|---|---|
| 2018/0137155 A1* | 5/2018 | Majumdar | .............. G06F 16/28 |
| 2020/0242444 A1* | 7/2020 | Zhang | ...................... G06N 3/08 |

OTHER PUBLICATIONS

Ciliberto, "Quantum machine learning: a classical perspective", Proc. R. Soc. A 474: 20170551, 2018. (Year: 2018).*
Ma, "Quantum Machine Learning on Knowledge Graphs", 32nd Conference on Neural Information Processing Systems (NIPS Dec. 2018), Montréal, Canada. (Exception as prior art under 102(b)(1)(A)—listed for completeness of record). (Year: 2018).*
(Continued)

*Primary Examiner* — Dave Misir
(74) *Attorney, Agent, or Firm* — Schmeiser, Olsen & Watts LLP (57) ABSTRACT

A method of performing an inference task on a knowledge graph comprising semantic triples of entities, wherein entity types are subject, object and predicate, and wherein each semantic triple comprises one of each entity type, using a quantum computing device, wherein a first entity of a first type and a second entity of a second type are given and the inference task is to infer a third entity of the third type. By performing specific steps and choosing values according to specific prescriptions, an efficient and resource-saving method is developed that utilizes the power of quantum computing systems for inference tasks on large knowledge graphs. An advantageous value for a cutoff threshold for a cutoff based on singular values of a singular value tensor decomposition is prescribed, and a sequence of steps is developed in which only the squares of the singular values are of consequence and their signs are not.

10 Claims, 2 Drawing Sheets

(56) References Cited

OTHER PUBLICATIONS

Ma, "Quantum Machine Learning Algorithm for Knowledge Graphs" 2020. (Date and authors precludes as prior art usage—listed for completeness of record and showing the NPL research of the application). (Year: 2020).*

Ma et al., "Variational Quantum Circuit Model for Knowledge Graphs Embedding", arXiv: 1903.00556v1 of Feb. 19, 2019.

Maximilian Nickel et al., "A review of relational machine learning for knowledge graphs", Proceedings of the IEEE, 104(1):11-33, 2016.

I. Kerenidis et al., "Quantum Recommendation Systems", arXiv: 1603.08675v3 of Sep. 22, 2016.

A. Kitaev, "Quantum measurements and the Abelian Stabilizer Problem", arXiv: quant-ph/9511026v1 of Nov. 20, 1995.

Nielsen et al., "Quantum computation and quantum information", Cambridge University Press, ISBN 9780521635035.

Dimitris Achlioptas and Frank McSherry, "Fast computation of low-rank matrix approximations", Journal of the ACM (JACM), 54(2):9, 2007.

S. Lloyd et al., "Quantum principal component analysis", arXiv:1307.0401v2 of Sep. 16, 2013.

Jie Chen and Yousef Saad, "On the tensor svd and the optimal low rank orthogonal approximation of tensors", SIAM Journal on Matrix Analysis and Applications, 30(4):1709-1734, 2009.

P. Rebentrost, "Quantum singular value decomposition of non-sparse low-rank matrices", arXiv:1607.05404v1 of Jul. 19, 2016.

V. Giovannetti et al., "Quantum random access memory", arXiv: 0708.1879v2 of Mar. 26, 2008.

* cited by examiner

QUANTUM MACHINE LEARNING ALGORITHM FOR KNOWLEDGE GRAPHS

FIELD OF TECHNOLOGY

The present invention relates to a computer-implemented method of performing an inference task on a knowledge graph comprising semantic triples of entities, wherein entity types are subject, object and predicate, and wherein each semantic triple comprises one of each entity type, using a quantum computing device, wherein a first entity of a first type and a second entity of a second type are given and the inference task is to infer a third entity of the third type.

The invention also relates to a computing system for performing said computer-implemented method.

BACKGROUND

Semantic knowledge graphs (KGs) are graph-structured databases consisting of semantic triples (subject, predicate, object), where subject and object are nodes in the graph and the predicate is the label of a directed link between subject and object. An existing triple normally represents a fact, e.g., (California, located in, USA) with "California" being the subject, "located in" being the predicate and "USA" being the object. Missing triples stand for triples known to be false (closed-world assumption) or with unknown truth value. In recent years a number of sizable knowledge graphs have been developed. For example, the currently largest KGs contain more than 100 billion facts and hundreds of millions of distinguishable entities.

The large number of facts and entities in a knowledge graphs makes it particularly difficult to scale the learning and inference algorithm to perform inference on the entire knowledge graph.

In the fields of tensor decomposition and matrix factorization, among others the following algorithms have been developed so far:

In the publication by Jie Chen and Yousef Saad, "On the tensor svd and the optimal low rank orthogonal approximation of tensors", SIAM Journal on Matrix Analysis and Applications, 30(4):1709-1734, 2009 (hereafter cited as "Chen et al."), the singular value decomposition of tensors is described.

In the publication by Dimitris Achlioptas and Frank McSherry, "Fast computation of low-rank matrix approximations", Journal of the ACM (JACM), 54(2):9, 2007 (hereafter cited as "Achlioptas et al."), methods for fast computation of low-rank matrix approximations of large matrices are described.

In the publication by Maximilian Nickel et al., "A review of relational machine learning for knowledge graphs", Proceedings of the IEEE, 104(1):11-33, 2016 (hereafter cited as "Nickel et al."), some fundamental mathematical properties regarding knowledge graphs are described.

In the fields of quantum computing, several methods and algorithms have been developed so far.

For example, the publication by S. Lloyd et al., "Quantum principal component analysis", arXiv: 1307.0401v2 of Sep. 16, 2013 (cited hereafter as "Lloyd et al."), describes a method of using a density matrix (or: a density operator) $\rho$, for determining eigenvectors of unknown states.

In the publication by I. Kerenidis et al., "Quantum Recommendation Systems", arXiv: 1603.08675v3 of Sep. 22, 2016 (cited hereafter as "Kerenidis et al."), a quantum algorithm for recommendation systems is described.

In the publication by P. Rebentrost, "Quantum singular value decomposition of non-sparse low-rank matrices", arXiv: 1607.05404v1 of Jul. 19, 2016 (cited hereafter as "Rebentrost et al."), a method for exponentiating non-sparse indefinite low-rank matrices on a quantum computer is proposed.

In the publication by A. Kitaev, "Quantum measurements and the Abelian Stabilizer Problem", arXiv: quant-ph/9511026v1 of Nov. 20, 1995 (hereafter cited as "Kitaev"), a polynomial quantum algorithm for the Abelian stabilizer problem is proposed. The method is based on a procedure for measuring an eigenvalue of a unitary operator.

In the publication by V. Giovannetti et al., "Quantum random access memory", arXiv: 0708.1879v2 of Mar. 26, 2008 (hereafter cited as "Giovannetti et al."), a method for implementing a robust quantum random access memory, qRAM, algorithm is proposed.

The publication by Ma et al., "Variational Quantum Circuit Model for Knowledge Graphs Embedding", arXiv: 1903.00556v1 of Feb. 19, 2019 (hereafter cited as "Ma et al."), variational quantum circuits for knowledge graph embedding and related methods are proposed.

A basic textbook about quantum information theory is the textbook by Nielsen et al., "Quantum computation and quantum information", Cambridge University Press, ISBN 9780521635035 hereafter cited as "Nielsen et al.".

SUMMARY

It is an object of the present invention to provide an improved method of performing an inference task and an improved system for performing an inference task, in particular by utilizing the intrinsically parallel computing power of quantum computation and by providing quantum algorithms which can dramatically accelerate the inference task.

Thanks to the rapid development of quantum computing technologies, quantum machine learning is becoming an active research area which attracts researchers from different communities. In general, quantum machine learning exhibits great potential for accelerating classical algorithms.

Most of quantum machine learning algorithms contain subroutines for singular value decomposition, singular value estimation and singular value projection of data matrices that are prepared and presented as quantum density matrices. However, unlike it is the case for matrices, most tensor problems are NP-hard and there is no existing quantum computation method which can handle tensorized data. Since knowledge graphs comprise at least triplets of entities, and are thus modelled by at least three-dimensional tensors, such a quantum computation method is desired.

The above objectives are solved by the subject-matter of the independent claims. Advantageous options, refinements and variants are described in the dependent claims.

Therefore, the present invention provides, according to a first aspect, a computer-implemented method of performing an inference task on a knowledge graph comprising semantic triples of entities, wherein entity types are subject, object and predicate, and wherein each semantic triple comprises one of each entity type, using a quantum computing device, wherein a first entity of a first type and a second entity of a second type are given and the inference task is to infer a third entity of the third type, comprising at least the steps of:

providing a query comprising the first entity and the second entity;

modelling the knowledge graph as a partially observed tensor $\hat{\chi}$ in a classical computer-readable memory structure;

providing a cutoff threshold, $\tau$;

creating, from the partially observed tensor $\hat{\chi}$, a density operator in a quantum random access memory, qRAM, on the quantum computing device;

preparing a unitary operator, U, based on the created density operator, comprising states on the clock register, C;

creating a first entity state $|\chi_s^{(1)}\rangle$ indicating the first entity on an input data register of the qRAM, wherein the first entity state is entangled with a maximally entangled clock register, C;

applying the prepared unitary operator to at least the first entity state and the entangled clock register C;

performing thereafter a quantum phase estimation on the clock register, C;

performing thereafter a computation on the clock register, C, to recover singular values;

creating an auxiliary qubit in an auxiliary register, R, which is entangled with the state resulting from the previous step;

wherein the auxiliary register, R, has a first eigenstate $|1\rangle_R$ and a second eigenstate $|0\rangle_R$;

performing, on the result of the computation to recover the singular values, a singular value projection conditioned on the state of the auxiliary register, R, such that eigenstates whose squared singular values are to one side of the squared cutoff threshold, $\tau^2$, are entangled with the first eigenstate $|1\rangle_R$ of the auxiliary register, R, and such that eigenstates whose squared values are to another side of the squared cutoff threshold, $\tau^2$, or equal to the squared cutoff threshold, $\tau^2$, are entangled with the second eigenstate $|0\rangle_R$ of the auxiliary register, R;

measuring on the auxiliary register, R, and post-selecting one of the two eigenstates $|0\rangle_R$;

tracing out the clock register, C;

measuring the result thereof in a canonical basis of the input register, wherein the canonical basis comprises tensor products of a basis connected to the second entity type and of a basis connected to the third entity type;

post-selecting the second entity in the basis connected to the second entity type to infer the third entity.

Therefore, in this work a quantum machine learning method on tensorized data is proposed, e.g., on data derived from large knowledge graphs. The presented tensor factorization method advantageously has a polylogarithmic runtime complexity.

Quantum machine learning algorithms on two-dimensional matrices data, such as a preference matrix in a recommendation system, may be performed in any known way, for example as has been described in "Kerenidis et al.".

The partially observed tensor $\hat{\chi}$ may be interpreted as a sub-sampled (or: sparsified) tensor of a theoretically completely filled tensor $\chi$ which comprises the information about all semantic triplets for all subjects, objects and predicates of given sets.

Providing the cutoff threshold T may comprise calculating the cutoff threshold as will be described in the following.

Creating the density operator in the quantum random access memory may be performed in any known way, for example as has been described in "Giovannetti et al.".

The quantum computing device may be implemented in any known way, for example as has been described in "Ma et al.".

Preparing the unitary operator and applying it to the first entity state may be performed in any known way, for example as has been described in "Lloyd et al." and/or "Rebentrost et al.".

Performing the quantum phase estimation on the clock register may be performed in any known way, for example as has been described in "Kitaev".

Performing the computation to retrieve the singular values may be performed in any known way, for example as has been described in "Nielsen et al.".

The quantum singular value projection and/or the tracing out of the clock register may be performed in any known way, for example as has been described in "Rebentrost et al.".

The method described herein is highly advantageous because it shows how a meaningful cutoff for a useful approximation of a partially known tensor can be achieved. In matrix cutoff schemes based on matrix singular value decomposition, essentially the singular values larger than, or equal to, a cutoff threshold are kept and those that are smaller are disregarded.

However, in the tensor case, negative singular values can arise. This ordinarily creates the problem that, according to a normal ordering, singular values with large absolute values but negative sign would be arranged behind singular values with positive values with small absolute values. The classical cutoff scheme then is no longer be meaningful, as it would disregard singular values with large negative values which may potentially be important.

In the present invention, this issue is overcome by performing the method with the described steps so that the cutoff threshold is applied to the squares of the singular values, thus ignoring the above-discussed sign problem.

In some advantageous embodiments or refinements of embodiments, the partially observed tensor $\hat{\chi}$ is obtained such that, for each entry of the partially observed tensor, the entry is with a probability p directly proportional to a corresponding entry of a complete tensor $\chi$ modelling a complete knowledge graph and equal to 0 with a probability of 1–p, with p being smaller than 1. This allows to determine the cutoff threshold $\tau$ in a suitable way so that the required computing power and required memory is minimized.

In some advantageous embodiments or refinements of embodiments, the cutoff threshold is chosen as smaller or equal to a quantity which is indirectly proportional to the probability p. The inventors have found this to be a useful criterion for choosing a suitable cutoff threshold.

In some advantageous embodiments or refinements of embodiments, the probability p is chosen to be larger to or equal a maximum value out of a set of values. That set may be designated as a "lower bound set".

In some advantageous embodiments or refinements of embodiments, the set of values comprises at least a value of 0.22.

In some advantageous embodiments or refinements of embodiments, the partially observed tensor $\hat{\chi}$ is expressable as the sum of the complete tensor $\chi$ and a noise tensor N. A desired value $\tilde{\in}>0$ may be defined such that the Frobenius norm $\|\bullet\|_F$ of a rank-r-approximation $\mathcal{N}_r$ of the noise tensor $\mathcal{N}$ is bounded such that $\|\mathcal{N}_r\|_F \leq \tilde{\in} \|A\|_F$. The set of values comprises at least one value that is proportional to r and indirectly proportional to $\tilde{\in}$ to the n-th power, with n integer and n≥1.

In some advantageous embodiments or refinements of embodiments, the set of values comprises at least one value that is proportional to r and that is indirectly proportional to the square of $\tilde{\in}$.

In some advantageous embodiments or refinements of embodiments, the set of values comprises at least one value that is proportional to a square root of r and that is indirectly proportional to $\tilde{\in}$.

In some advantageous embodiments or refinements of embodiments, the set of values comprises at least one value that is independent of r and that is indirectly proportional to the square of $\tilde{\in}$.

The present invention also provides, according to a second aspect, a computing system comprising a classical computing device and a quantum computing device, wherein the computing system is configured to perform the method according to any embodiment of the method according to the first aspect of the present invention. The computing system comprises an input interface for receiving an inference task (or: query, i.e. a first entity of a first entity type and a second entity of a second entity type), and an output interface for outputting the inferred third entity of the third entity type.

The computing device may be realised as any device, or any means, for computing, in particular for executing a software, an app, or an algorithm. For example, the computing device may comprise a central processing unit (CPU) and a memory operatively connected to the CPU. The computing device may also comprise an array of CPUs, an array of graphical processing units (GPUs), at least one application-specific integrated circuit (ASIC), at least one field-programmable gate array, or any combination of the foregoing.

Some, or even all, parts of the computing device may be implemented by a cloud computing platform.

A storage/memory may be a data storage like a magnetic storage/memory (e.g. magnetic-core memory, magnetic tape, magnetic card, magnet strip, magnet bubble storage, drum storage, hard disc drive, floppy disc or removable storage), an optical storage/memory (e.g. holographic memory, optical tape, Tesa tape, Laserdisc, Phasewriter (Phasewriter Dual, PD), Compact Disc (CD), Digital Video Disc (DVD), High Definition DVD (HD DVD), Blu-ray Disc (BD) or Ultra Density Optical (UDO)), a magneto-optical storage/memory (e.g. MiniDisc or Magneto-Optical Disk (MO-Disk)), a volatile semiconductor/solid state memory (e.g. Random Access Memory (RAM), Dynamic RAM (DRAM) or Static RAM (SRAM)), a non-volatile semiconductor/solid state memory (e.g. Read Only Memory (ROM), Programmable ROM (PROM), Erasable PROM (EPROM), Electrically EPROM (EEPROM), Flash-EEPROM (e.g. USB-Stick), Ferroelectric RAM (FRAM), Magnetoresistive RAM (MRAM) or Phase-change RAM) or a data carrier/medium.

The invention will be explained in yet greater detail with reference to exemplary embodiments depicted in the drawings as appended.

The accompanying drawings are included to provide a further understanding of the present invention are incorporated in and constitute a part of the specification. The drawings illustrate the embodiments of the present invention and together with the description serve to illustrate the principles of the invention. Other embodiments of the present invention and many of the intended advantages of the present invention will be readily appreciated as they become better understood by reference to the following detailed description. Like reference numerals designate corresponding similar parts.

The numbering of method steps is intended to facilitate understanding and should not be construed, unless explicitly stated otherwise, to mean that the designated steps have to be performed according to the numbering of their reference signs. In particular, several or even all of the method steps may be performed simultaneously, in an overlapping way or sequentially.

BRIEF DESCRIPTION

DETAILED DESCRIPTION

Although specific embodiments have been illustrated and described herein, it will be appreciated by those of ordinary skill in the art that the variety of alternate and/or equivalent implementations may be substituted for the specific embodiments shown and described without departing from the scope of the present invention. Generally, this application is intended to cover any adaptations or variations of the specific embodiments discussed herein.

Figure 1:
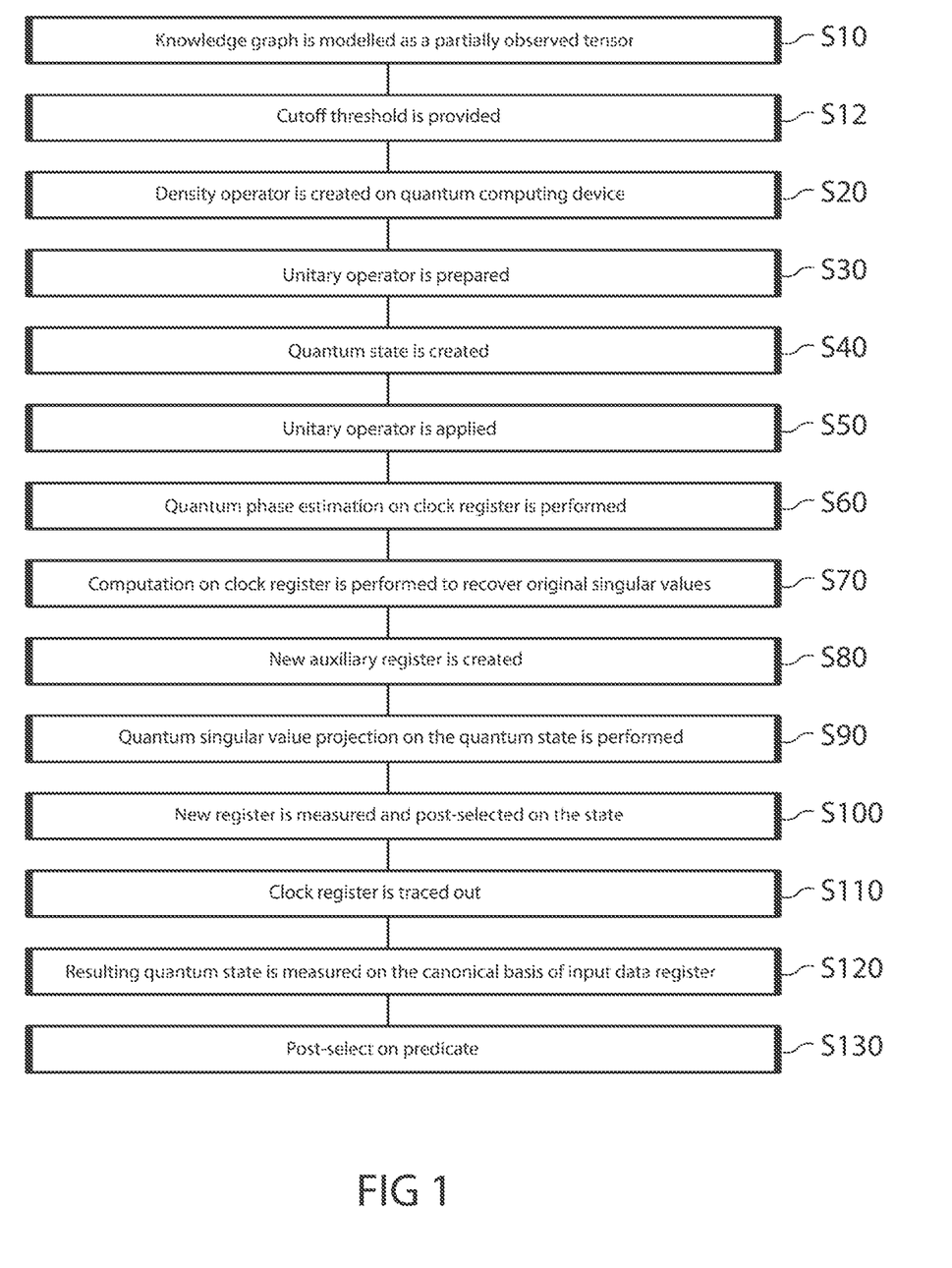
FIG. 1 shows a schematic flow diagram illustrating a method according to an embodiment of the first aspect of the present invention.

FIG. 1 shows a schematic flow diagram illustrating a method according to an embodiment of the first aspect of the present invention.

This description contains two parts. The first part contributes to the classical binary tensor sparsification method. Especially, the first binary tensor sparsification condition is derived under which the original tensor can be well approximated by a truncated (or: projected) tensor SVD of its subsampled tensor.

The second part contributes to the method of performing knowledge graph inference on universal quantum computers. In order to handle the tensorized data, a quantum tensor contraction subroutine is described. Then, a quantum sampling method on knowledge graphs using quantum principal component analysis, quantum phase estimation and quantum singular value projection is described. The runtime complexity is analyzed, and it is shown that this sampling-based quantum computation method provides exponential acceleration with respect to the size of the knowledge graph during inference.

All the state-of-the-art algorithms for statistical relational learning on knowledge graphs are implemented on classical computational powers, e.g., CPUs or GPUs. The major difference between a classical approach and quantum approach is that classical algorithm is learning-based, e.g., by back-propagating the gradients of loss function, while the proposed quantum algorithm is sampling-based. The present method for implicit knowledge inference on knowledge graphs is implemented at least by measuring the quantum states returned by the quantum algorithm without requiring any particular loss function and gradients update rules.

In the first part in the following the conditions under which the classical tensor singular value decomposition (tSVD) can be applied to recover a subsampled tensor are shown. These conditions ensure that the quantum counterpart is feasible and has good performance in comparison with benchmarking classical algorithms. The second part explains the method of implicit knowledge inference from tensorized data on universal quantum computers. Furthermore, the runtime complexity of the quantum method is analyzed.

As an overview, first some theoretical and practical foundations and considerations for the method are described, and then the method according to an embodiment of the first aspect of the present invention is described in more detail. In addition, we also incidentally describe a computing system according to an embodiment of the second aspect of the present invention.

Part 1: Classical Tensor Singular Value Decomposition

First, singular value decomposition (SVD) of matrices is described. Then, a tensor SVD is introduced and it is shown that a given tensor can be reconstructed with a small error from the low-rank tensor SVD of the subsampled tensor.

the single value decomposition, SVD, can be defined in the following: let $A \in \mathbb{R}^{m \times n}$, the SVD is a factorization of A of the form $A = U\Sigma V^T$, where $\Sigma$ is a rectangle diagonal matrix with singular values on the diagonal, $U \in \mathbb{R}^{m \times m}$ and $V \in \mathbb{R}^{n \times n}$ are orthogonal matrices with $U^T U = UU^T = I_m$ and $V^T V = VV^T = I_n$, wherein $I_m$ is an m×m identity matrix.

An N-way tensor is defined as $\mathcal{A} = (\mathcal{A}_{i_1 i_2 \ldots i_N}) \in \mathbb{R}^{d_1 \times d_2 \times \ldots \times d_N}$, where $d_k$ is the k-th dimension. Given two tensors $\mathcal{A}$ and $\mathcal{B}$ with the same dimensions, the inner product is defined as $$\langle \mathcal{A}, \mathcal{B} \rangle_F := \sum_{i_1=1}^{d_1} \ldots \sum_{i_N=1}^{d_N} \mathcal{A}_{i_1 i_2 \ldots i_N} \mathcal{B}_{i_1 i_2 \ldots i_N}$$

The Frobenius norm is defined as $\|\mathcal{A}\|_F := \sqrt{\langle \mathcal{A}, \mathcal{A} \rangle_F}$. The spectral norm $\|\mathcal{A}\|_\sigma$ of the tensor A is defined as $$\max\{\mathcal{A} \otimes_1 x_1 \ldots \otimes_N x_N | x_k \in S^{d_k-1}, k=1 \ldots N\}, \quad (1)$$

where the tensor-vector product is defined as $$\mathcal{A} \otimes_1 x_1 \ldots \otimes_N x_N := \sum_{i_1=1}^{d_1} \ldots \sum_{i_N=1}^{d_N} \mathcal{A}_{i_1 i_2 \ldots i_N} x_{1 i_1} x_{2 i_2} \ldots x_{N i_N}$$

and $S^{d_k-1}$ denotes the unit sphere in $\mathbb{R}^{n_k}$.

In the following, a tensor single value decompositions, Tensor SVD, is described. In analogy to the matrix singular value decomposition, tensor singular value decomposition is described in detail e.g. in "Chen et al.".

Definition 1. If a tensor $\mathcal{A} \in \mathbb{R}^{d_1 \times d_2 \times \ldots \times d_N}$ can be written as a sum of rank–1 outer product tensors $\mathcal{A} = \sum_{i=1}^R \sigma_i u_1^{(i)} \otimes u_2^{(i)} \ldots \otimes u_N^{(i)}$, with singular values $\sigma_1 \geq \sigma_2 \geq \ldots \geq \sigma_R$ and $\langle u_k^{(i)}, u_k^{(j)} \rangle = \delta_{ij}$ for k=1, ..., N, then $\mathcal{A}$ has a tensor singular value decomposition with rank R.

In real-world applications, we can only observe part of the non-zero entries in a given tensor $\mathcal{A}$, and the task is to infer unobserved non-zero entries with high probability. This corresponds to items recommendation for users given an observed preference matrix, or implicit knowledge inference given partially observed relational database. In other words, a "partially observed" tensor representing a knowledge graph is only partially known, since not all semantic triplets are known a priori, and the inference task is to infer interesting entities (subject, predict, or object) of semantic triples which are not contained in the "partially observed" tensor but which would be obtained in a hypothetical complete tensor $\mathcal{A}$. The partially observed tensor is herein also designated as sub-sampled or sparsified, denoted $\hat{\mathcal{A}}$.

Particularly, without further specifying the dimensionality of the tensor, the following subsampling and rescaling scheme proposed in "Achlioptas et al." is used:

$$\hat{\mathcal{A}}_{i_1 i_2 \ldots i_N} = \begin{cases} \dfrac{\mathcal{A}_{i_1 i_2 \ldots i_N}}{p} & \text{with probability } p \\ 0 & \text{otherwise.} \end{cases} \quad (2)$$

This means that the non-zero elements of a hypothetical complete tensor $\mathcal{A}$ are independently and identically sampled with the probability p and rescaled afterwards. The sub-sampled tensor can be rewritten as $\hat{\mathcal{A}} = \mathcal{A} + \mathcal{N}$, where $\mathcal{N}$ is a noise tensor. Entries of $\mathcal{N}$ are thus independent random variables with distribution $$\mathcal{N}_{i_1 \ldots i_N} = \begin{cases} \left(\dfrac{1}{p} - 1\right) \mathcal{A}_{i_1 \ldots i_N} & \text{with probability } p \\ -\mathcal{A}_{i_1 \ldots i_N} & \text{with probability } 1-p \end{cases} \quad (3)$$

In the following, a 3-dimensional semantic tensor $\chi$ as one example of a tensor $\mathcal{A}$ is of particular interest. The present methods builds on the assumption that the original semantic tensor $\chi$ modelling the complete knowledge graph (or, in from a different viewpoint, the tensor $\chi$ as the complete knowledge graph) has a low-rank approximation, denoted $\chi_r$, with small rank r.

This is a plausible assumption if the knowledge graph contains global and well-defined relational patterns, as has been shown in "Nickel et al.". Therefore, the question may be posed under what conditions the original tensor $\chi$ can be reconstructed approximately from the low-rank approximation of subsampled semantic tensor $\hat{\chi}$ derived from the incomplete knowledge graph. In the following, $\hat{\chi}_r$ denotes the r-rank approximation of the subsampled tensor $\hat{\chi}$; and $\hat{\chi}_{|\cdot| > \tau}$ denotes the projection of $\hat{\chi}$ onto the subspaces whose absolute singular values are larger than a predefined threshold $\tau > 0$.

Thus, with reference to FIG. 1, in a first step S10, a knowledge graph is modelled as a partially observed tensor $\hat{\chi}$ in a classical computer-readable memory structure.

This classical computer-readable memory structure may be any volatile or non-volatile computer-readable memory structure such as a hard drive, a solid state drive and/or the like. The computer-readable memory structure may be part of a classical computing device which in turn may be part of a computing system for performing an inference task on a knowledge graph.

Figure 2:
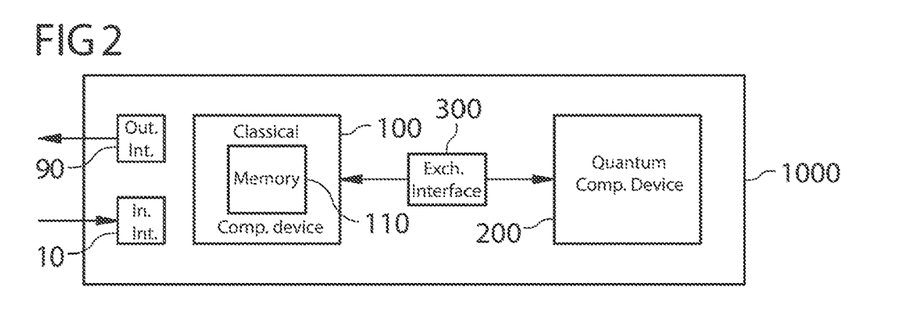
FIG. 2 shows a schematic block diagram of a computing according to an embodiment of the second aspect of the present invention.

FIG. 2 shows a schematic block diagram of a computing system 1000 for performing an inference task on a knowledge graph according to an embodiment of the second aspect of the present invention.

FIG. 2 shows that the computing system 1000 comprises two main components: a classical computing device 100 as well as a quantum computing device 200 which are connected by an exchange interface 300 therebetween. The quantum computing device 200 may be implemented in any known way, for example as has been described in "Ma et al.". Moreover, the computing system 1000 comprises an input interface 10, in particular for receiving an inference task (or: query) with a first entity of a first entity type and a second entity of a second entity type, e.g. (s, p, ?) or (?, p, o) or (s, ?, o) and an output interface 90 for outputting the inferred third entity of the third entity type o, s, or p, respectively.

It shall be understood that the method that is being described with respect to FIG. 1 may be performed using a computing system according to an embodiment of the second aspect of the present invention, in particular the computing system 1000 of FIG. 2 and/or that the computing system 1000 may be adapted to perform the method according to an embodiment of the first aspect of the present invention, in particular the method according to FIG. 1.

In further description of the method of FIG. 1, in the next two theorems, subsample conditions are shown under which the original semantic tensor $\chi$ can be reconstructed approximately from $\hat{\chi}_r$ or $\hat{\chi}_{|\cdot|>\tau}$. The analysis was conducted by bounding the reconstruction error $\|\chi-\hat{\chi}_r\|_F$ and $\|\chi-\hat{\chi}_{|\cdot|>\tau}\|_F$, respectively. Bounding the reconstruction error ensures a good implicit knowledge inference.

Suppose that we infer on a knowledge graph given the query (s, p, ?), i.e. subject s and predicate p are given, and the inference task at hand is to infer on the object o which completes the semantic triplet—or, in other words, which makes the semantic statement (s, p, o) true.

In the present context, the subjects are a first entity type which corresponds to a dimension of size $d_1$ in $\chi$ and $\hat{\chi}$; the predicates are a second entity type which corresponds to a dimension of size $d_2$ in $\chi$ and $\hat{\chi}$; and the objects are a third entity type which corresponds to a dimension of size $d_3$ in $\chi$ and $\hat{\chi}$.

Then, given an incomplete semantic triple (or: query, or: inference task) as (s, p, ?), the running time for inferring the correct objects to the query scales, in classical systems, as $O(d_3)$. This is because the same algorithm is repeated at least $d_3$ times in order to determine possible answers, leading to huge waste of computing power especially, when nowadays the sizes of knowledge graphs are consistently growing.

Advantageously, only top-n returns from the reconstructed tensor $\hat{\chi}$ written as $\hat{\chi}_{sp1}, \ldots, \hat{\chi}_{spn}$, are read out, where n is a small integer corresponding to the commonly used Hits@n metric (see e.g. "Ma et al."). The inference is called successful if the correct object corresponding to the query can be found in the returned list $\hat{\chi}_{sp1}, \ldots, \hat{\chi}_{spn}$. It can be proven that the probability of a successful inference is high if the reconstruction error small enough. Therefore, in the following we provide sub-sampling conditions under which the construction error is unexpectedly small.

Without further specifying the dimension of the tensor, let us consider a high-dimensional tensor $\mathcal{A}$. Theorem 1 gives the condition for the subsample probability under which the original tensor $\mathcal{A}$ can be reconstructed approximately from $\hat{\mathcal{A}}_r$.

Theorem 1. Let $\mathcal{A} \in \{0, 1\}^{d_1 \times d_2 \times \cdots \times d_N}$. Suppose that $\mathcal{A}$ can be well approximated by its r-rank tensor SVD $\mathcal{A}_r$. Using the subsampling scheme defined in Eq. 2 with the sample probability $$p \geq \max\left\{0.22, 8r\left(\log\left(\frac{2N}{N_0}\right)\sum_{k=1}^{N} d_k + \log\frac{2}{\delta}\right) \Big/ (\bar{\epsilon}\|\mathcal{A}\|_F)^2\right\},$$

where $N_0=\log 3/2$, then the original tensor $\mathcal{A}$ can be recons from the truncated tensor SVD of the subsampled tensor $\hat{\mathcal{A}}$. The error satisfies $\|\mathcal{A}-\hat{\mathcal{A}}_r\|_F \leq \epsilon \|\mathcal{A}\|_F$ with probability at least $1-\delta$, where $\epsilon$ is a function of $\bar{\epsilon}$. Especially, $\bar{\epsilon}$ together with the sample probability controls the norm of the noise tensor.

In particular it is desired that the Frobenius norm $\|\cdot\|_F$ of a rank-r-approximation $\mathcal{N}_r$ of the noise tensor $\mathcal{N}$ is bounded such that $\|\mathcal{N}_r\|_F \leq \bar{\epsilon}\|\mathcal{A}\|_F$.

Now, it is briefly discussed why tensor $\hat{\mathcal{A}}_{|\cdot|>\tau}$ is introduced before describing the reconstruction error caused by it. Note that quantum algorithms are fundamentally different from classical algorithms. For example, classical algorithms for matrix factorization approximate a low-rank matrix by projecting it onto a subspace spanned by the eigenspaces possessing top-r singular values with predefined small r. Quantum methods, e.g., quantum singular value estimation, on the other hand, can read and store all singular values of a unitary operator into a quantum register.

However, singular values stored in the quantum register cannot be read out and compared simultaneously since quantum state collapses after one measurement; measuring the singular values one by one will also break the quantum advantage. Therefore, we perform a projection onto the union of operator's subspaces whose singular values are larger than a threshold; and this step can be implemented on the quantum register without destroying the superposition. Moreover, since herein quantum principal component analysis is used as a subroutine which ignores the sign of singular values during the projection, reconstruction error given by $\hat{\mathcal{A}}_{|\cdot|\geq\tau}$ for the quantum algorithm may be analyzed.

The following Theorem 2 gives the condition under which $\mathcal{A}$ can be reconstructed approximately from $\hat{\mathcal{A}}_{|\cdot|>\tau}$.

Theorem 2. Let $\mathcal{A} \in \{0, 1\}^{d_1 \times d_2 \times \cdots \times d_N}$. Suppose that $\mathcal{A}$ can be well approximated by its r-rank tensor SVD $\mathcal{A}_r$. Using the subsampling scheme defined in Eq. 2 with the sample probability $$p \geq \max\left\{0.22, p_1 := \frac{l_1 C_0}{(\bar{\epsilon}\|\mathcal{A}\|_F)^2}, p_2 := \frac{rC_0}{(\bar{\epsilon}\|\mathcal{A}\|_F)^2}, p_3 := \frac{\sqrt{2rC_0}}{\epsilon_1\bar{\epsilon}\|\mathcal{A}\|_F}\right\},$$

wherein p<1, wherein $$C_0 = 8\left(\log\left(\frac{2N}{N_0}\right)\sum_{k=1}^{N} d_k + \log\frac{2}{\delta}\right),$$

$N_0=\log 3/2$; $l_1$ denotes the largest index of singular values of tensor $\hat{\mathcal{A}}$ with $\sigma_{l_1} \geq \tau$, such that wen choosing the threshold as $$\tau \leq \frac{\sqrt{2C_0}}{p\bar{\epsilon}},$$

then the original tensor $\mathcal{A}$ can be reconstructed from the projected tensor SVD of $\hat{\mathcal{A}}$. The error satisfies $\|\mathcal{A}-\mathcal{A}_{|\cdot|\geq\tau}\|_F \leq \epsilon \|\mathcal{A}\|_F$ with probability at least $1-\delta$, where $\epsilon$ is a function of $\bar{\epsilon}$ and $\epsilon_1$. Especially, $\bar{\epsilon}$ together with $p_1$ and $p_2$ determine the norm of noise tensor and $\epsilon_1$ together with $p_3$ control the value of $\hat{\mathcal{A}}$'s singular values that are located outside the projection boundary.

Thus, as shown in the equation above, advantageously the threshold τ is chosen as smaller or equal to a quantity which is indirectly proportional to the probability p and/or smaller or equal to a quantity which is indirectly proportional to $\tilde{\epsilon}$.

On the other hand, the probability p is advantageously chosen to be larger to or equal a maximum value out of a set of values, which set of values in the foregoing example comprises four values: 0.22, p1, p2, and p3. In other words, p will always be larger or equal to at least 0.22. Instead of 0.22, another value in the range of 0.2 and 0.24 may be chosen. However, experiments by the inventors have shown that 0.22 is an ideal value in order to ensure desirable properties for the threshold τ. Specifically, experiments as well as a numerical proof by the inventors have shown that 0.22 is the minimal subsample probability that a subsampled tensor can be reconstructed with a bounded error.

Thus, the set of values the set of values comprises:
a) at least one value in the range of between 0.2 and 0.24, preferably between 0.21 and 0.23, most preferably of 0.22;
b) at least one value $p_2$ that is proportional to r and indirectly proportional to $\tilde{\epsilon}$ to the n-th power, with n integer and n≥1, in particular proportional to r and indirectly proportional to the square of $\tilde{\epsilon}$;
c) at least one value $p_3$ that is proportional to a square root of r and that is indirectly proportional to $\tilde{\epsilon}$;
and/or
d) at least one value $p_1$ that is independent of r and that is indirectly proportional to the square of $\tilde{\epsilon}$.

In the bodies of Theorem 1 and 2 there exist data-dependent parameters r and $l_1$ which are unknown a priori. These parameters can be estimated by performing tensor SVD to the original and subsampled tensors explicitly. However, in practice, mostly the subsampled tensor is given without knowing the subsample probability. For example, given an incomplete semantic tensor it is usually not known what percentage of information is missing and therefore the entries in the incomplete tensor cannot be easily rescaled. Fortunately, unlike the prior art, the present invention provides a rational initial guess for the subsample probability numerically, and inversely an initial guess for the lower-rank r and the projection threshold τ as well.

Part 2: Inference on Knowledge Graphs Using Quantum Computers

Quantum Mechanics

For ease of understanding, the Dirac notations of quantum mechanics as it is used herein is briefly described. Under Dirac's convention quantum states can be represented as complex-valued vectors in a Hilbert space $\mathcal{H}$. For example, a two-dimensional complex Hilbert $\mathcal{H}_2$ space can describe the quantum state of a spin-1 particle, which provides the physical realization of a qubit.

By default, the basis in $\mathcal{H}_2$ for a spin-1 qubit read $|0\rangle=[1, 0]^T$ and $|1\rangle=[0, 1]^T$. The Hilbert space of a n-qubits system has dimension $2^n$ whose computational basis can be chosen as the canonical basis $|i\rangle \in \{|0\rangle, 1\rangle\}^{\otimes n}$, where $\otimes$ represents tensor product. Hence any quantum state $|\phi\rangle \in \mathcal{H}_{2^n}$ can be written as a quantum superposition $$|\phi\rangle = \sum_{i=1}^{2^n} \phi_i |i\rangle,$$

wherein the squared coefficients $|\phi_i|^2$ can also be interpreted as the probability of observing the canonical basis state $|i\rangle$ after measuring $|\phi\rangle$ using canonical basis.

Moreover, we use $\langle\phi|$ is used to represent the conjugate transpose of $|\phi\rangle$, i.e., $(|\phi\rangle)^\dagger=\langle\phi|$. Given two stats $|\phi\rangle$ and $|\psi\rangle$ The inner product on the Hilbert space is defined as $\langle\phi|\psi\rangle^* = \langle\psi|\phi\rangle$. A density matrix is a projection operator which is used to describe the statistics of a quantum system. For example, the density operator of the mixed state $|\phi\rangle$ in the canonical basis reads $\rho = \sum_{i=1}^{2^n} |\phi_i|^2 |i\rangle\langle i|$. Moreover, given two subsystems with density matrices ρ and σ the density matrix for the whole system is their tensor product, namely $\rho \otimes \sigma$.

The time evolution of a quantum state is generated by the Hamiltonian of the system. The Hamiltonian H is a Hermitian operator with $H^\dagger=H$. Let $|\phi(t)\rangle$ denote the quantum state at time t under the evolution of an invariant Hamiltonian H. Then according to the Schrödinger equation $|\phi(t)\rangle=e^{-iHt}|\phi(0)\rangle$, where the unitary operator $e^{-iHt}$ can be written as the matrix exponentiation of the Hermitian matrix H, i.e., $$e^{-iHt} = \sum_{n=0}^{\infty} \frac{(iHt)^n}{n!}.$$

Eigenvectors of the Hamiltonian H, denoted $|u_i\rangle$, also form a basis of the Hilbert space. Then the spectral decomposition of the Hamiltonian H reads $H=\sum_i \lambda_i |u_i\rangle\langle u_i|$, where $\lambda_i$ is the eigenvalue or the energy level of the system. Therefore, the evolution operator of a time-invariant Hamiltonian can be rewritten as $$e^{-iHt} = e^{-it\sum_i \lambda_i |u_i\rangle\langle u_i|} = \sum_i e^{-i\lambda_i t}|u_i\rangle\langle u_i|, \qquad (4)$$

where we use the observation $(|u_i\rangle\langle u_i|)^n=|u_i\rangle\langle u_i|$ for $n=1, \ldots, \infty$.

When applying it on an arbitrary initial state $|\phi(0)\rangle$ we obtain $|\phi(t)\rangle=e^{-iHt}|\phi(0)\rangle=\sum_i e^{-i\lambda_i t}\beta_i|u_i\rangle$, where $\beta_i$ indicates the overlap between the initial state and the eigenbasis of H, i.e., $\beta_i:=\langle u_i|\phi(0)\rangle$. To implement the time evolution operator $e^{-iHt}$ and simulate the dynamics of a quantum system using universal quantum circuits is a challenging task since it involves the matrix exponentiation of a possibly dense matrix.

The present invention concerns a method for the inference on knowledge graphs using a quantum computing device 200. In the following we focus on the semantic tensor $\chi \in \{0, 1\}^{d_1 \times d_2 \times d_3}$, with $d_1$, $d_2$, and $d_3$ defined as above, and let $\tilde{\chi}$ denote the partially observed tensor.

Since knowledge graphs contain global relational patterns, $\chi$ could be approximated by a lower-rank tensor $\chi_r$ thereof reconstructed approximately from $\tilde{\chi}$ via tensor SVD according to Theorem 1 and 2. Since our quantum method is sampling-based instead of learning-based, without loss of generality we consider sampling the correct objects given the query (s, p, ?) as an example and discuss the runtime complexity of one inference. Herein we therefore designate the given subject as a first entity of a first entity type ("subjects"), the predicate as a second entity of a second entity type ("predicates") and the unknown object as a third entity of a third entity type ("objects").

The preference matrix of a recommendation system normally contains multiple nonzero entries in a given user-row;

items recommendations are made according to the nonzero entries in the user-row by assuming that the user is 'typical'. However, in a knowledge graph there might be only one nonzero entry in the row (s, p, •). Therefore, advantageously, for the inference on a knowledge graph quantum algorithm triples with the given subject s are sampled and then and post-selected on the predicate p. This is a feasible step especially if the number of semantic triples with s as subject and p as predicate is $\mathcal{O}(1)$.

The present method contains the preparing and exponentiating of a density matrix derived from the tensorized classical data. One of the challenges of quantum machine learning is loading classical data as quantum states and measuring the states since reading or writing high-dimensional data from quantum states might obliterate the quantum acceleration. Therefore, the technique quantum Random Access Memory (qRAM) was developed (see "Giovannetti et al.") which can load classical data into quantum states with exponential acceleration. For details about the qRAM technique, it is referred to "Giovannetti et al.". The basic idea of the present method is to project the observed data onto the eigenspaces of $\hat{\chi}$ whose corresponding singular values have an absolute value larger than a threshold $\tau$. Therefore, we need to create an operator which can reveal the eigenspaces and singular values of $\hat{\chi}$.

As mentioned in the foregoing, in a step S10, a knowledge graph is modelled as a partially observed tensor $\hat{\chi}$ in a classical computer-readable memory structure 110 of a classical computing device 100, see FIG. 2.

In a step S12, which does not have to be performed in this order necessarily, a cutoff threshold $\tau$ is provided, which is preferably determined as has been described in the foregoing.

In a step S20, the following density operator (or: density matrix) is created, on the quantum computing device 200, from $\hat{\chi}$ via a tensor contraction scheme:

$$\rho_{\hat{\chi}^\dagger \hat{\chi}} := \sum_{i_2 i_3 i'_2 i'_3} \sum_{i_1} \hat{\chi}^\dagger_{i_1, i_2 i_3} \hat{\chi}_{i_1, i'_2 i'_3} |i_2 i_3\rangle\langle i'_2 i'_3|, \quad (5)$$

where $$\sum_{i_1} \hat{\chi}^\dagger_{i_1, i_2 i_3} \hat{\chi}_{i_1, i'_2 i'_3}$$

means tensor contraction along the first dimension (here: the subject dimension since the exemplary inference task is is (s, p, ?)); a normalization factor is neglected temporarily.

Especially, $\rho_{\hat{\chi}^\dagger \hat{\chi}}$ can be prepared via qRAM (see "Giovannetti et al.") in time $$\mathcal{O}(\text{polylog}(d_1 d_2 d_3)) \quad (6)$$

in the following way: First, the quantum state $$\sum_{i_1 i_2 i_3} \hat{\chi}_{i_1, i_2 i_3} |i_1 i_2 i_3\rangle = \sum_{i_1 i_2 i_3} \hat{\chi}_{i_1, i_2 i_3} |i_1\rangle \otimes |i_2\rangle \otimes |i_3\rangle$$

is prepared via qRAM, which can be implemented in time $\mathcal{O}(\text{polylog}(d_1 d_2 d_3))$, where $|i_1\rangle \otimes |i_2\rangle \otimes |i_3\rangle$ represents the tensor product of index registers in the canonical basis.

The corresponding density matrix of the quantum state reads $$\rho = \sum_{i_1 i_2 i_3} \sum_{i'_1 i'_2 i'_3} \hat{\chi}_{i_1 i_2 i_3} |i_1\rangle \otimes |i_2\rangle \otimes |i_3\rangle\langle i'_1| \otimes \langle i'_2| \otimes \langle i'_3| \hat{\chi}^\dagger_{i'_1 i'_2 i'_3}.$$

After preparation, a partial trace implemented on the first index register of the density matrix $$tr_1(\rho) = \sum_{i_2 i_3} \sum_{i'_2 i'_3} \sum_{i_1} \hat{\chi}_{i_1 i_2 i_3} |i_2\rangle \otimes |i_3\rangle\langle i'_2| \otimes \langle i'_3| \hat{\chi}^\dagger_{i'_1 i'_2 i'_3}$$

$$= \sum_{i_2 i_3 i'_2 i'_3} \sum_{i_1} \hat{\chi}^\dagger_{i_1 i_2 i_3} \hat{\chi}_{i_1 i'_2 i'_3} |i_2 i_3\rangle\langle i'_2 i'_3|$$

gives the desired operator $\rho_{\hat{\chi}^\dagger \hat{\chi}}$.

Suppose that $\hat{\chi}$ has a tensor SVD approximation with $$\hat{\chi} \approx \sum_{i=1}^{R} \sigma_i u_1^{(i)} \otimes u_2^{(i)} \otimes u_3^{(i)}.$$

Then the spectral decomposition of the density operator can be written as $$\rho_{\hat{\chi}^\dagger \hat{\chi}} = \frac{1}{\sum_{i=1}^{R} \sigma_i^2} \sum_{i=1}^{R} \sigma_i^2 |u_2^{(i)}\rangle \otimes |u_3^{(i)}\rangle\langle u_2^{(i)}| \otimes \langle u_3^{(i)}|.$$

Especially, the eigenstates $|u_2^{(i)}\rangle \otimes |u_3^{(i)}\rangle$ of $\rho_{\hat{\chi}^\dagger \hat{\chi}}$ form another set of basis in the Hilbert space of the tensor product of quantum index registers.

Then we need to readout singular values of $\rho_{\hat{\chi}^\dagger \hat{\chi}}$ and write into another quantum register, preferably via the density matrix exponentiation method proposed in "Lloyed et al.". This operation is also referred to as quantum principal component analysis (qPCA).

In order to write the singular values into a quantum register, in a step S30 the unitary operator $$U := \sum_{k=0}^{K-1} |k\Delta t\rangle\langle k\Delta t|_C \otimes \exp(-ik\Delta t \tilde{\rho}_{\hat{\chi}^\dagger \hat{\chi}})$$

is prepared which is the tensor product of a maximally mixed state $$\sum_{k=0}^{K-1} |k\Delta t\rangle\langle k\Delta t|_C$$

with the exponentiation of the rescaled density matrix $$\tilde{\rho}_{\hat{\chi}^\dagger \hat{\chi}} := \frac{\rho_{\hat{\chi}^\dagger \hat{\chi}}}{d_2 d_3}.$$

Especially, the clock register C is needed for the phase estimation and $\Delta t$ determines the precision of estimated singular values.

Recall that the query is (s, p, ?) on the knowledge graph, and that the present method should return triples with subject s. Hence, in a step S40, the quantum state $|\hat{\chi}_s^{(1)}\rangle_I$ is created (or: generated) via qRAM in an input data register I, where $\hat{\chi}_s^{(1)}$ denotes the s-row of the flattened tensor $\hat{\chi}$ along the first dimension.

After preparing S40 the quantum state $|\hat{\chi}_s^{(1)}\rangle_I$, in a step S50 the prepared unitary operator U is applied onto $$\sum_{k=0}^{K-1} |k\Delta t\rangle_C \otimes |\hat{\chi}_s^{(1)}\rangle_I.$$

Implementing the unitary operator U is nontrivial since the exponent $\tilde{\rho}_{\hat{\chi}^\dagger\hat{\chi}}$ in the operator U could be a dense matrix, and exponentiating a dense matrix can be very involved. Therefore, one can use the dense matrix exponentiation method recently proposed in "Rebentrost et al.". Especially, one can show that the unitary operator $$e^{-it\tilde{\rho}_{\hat{\chi}^\dagger\hat{\chi}}}$$

can be applied to any quantum state up to an arbitrary simulation time t. The total number of steps for simulation is $$O\left(\frac{t^2}{\epsilon} T_{\tilde{\rho}}\right), \quad (7)$$

where $\epsilon$ is the desired accuracy, and $T_{\tilde{\rho}}$ is the time for accessing the density matrix $\tilde{\rho}$. Hence the unitary operator U can be applied to any quantum state given simulation time t in $$O\left(\frac{t^2}{\epsilon} T_{\tilde{\rho}}\right)$$

steps on quantum computers.

After applying the unitary operator U onto $$\sum_{k=0}^{K-1} |k\Delta t\rangle_C \otimes |\hat{\chi}_s^{(1)}\rangle_I$$

we have the following quantum state $$\sum_{i=1}^{R} \beta_i \left( \sum_{k=0}^{K-1} e^{-ik\Delta t \tilde{\sigma}_i^2} |k\Delta t\rangle_C \right) |u_2^{(i)}\rangle_I \otimes |u_3^{(i)}\rangle_I \quad (8)$$

where $$\tilde{\sigma}_i := \frac{\sigma_i}{\sqrt{d_2 d_3}}$$

are the rescaled singular values of $\tilde{\rho}_{\hat{\chi}^\dagger\hat{\chi}}$ (see Eq. 4). Moreover, $\beta_i$ are the coefficients of $|\hat{\chi}_s^{(1)}\rangle_I$ decomposed in the eigenbasis $|u_2^{(i)}\rangle_I \otimes |u_3^{(i)}\rangle_I$ of $\rho_{\hat{\chi}^\dagger\hat{\chi}}$, namely $|\hat{\chi}_s^{(1)}\rangle_I = \sum_{i=1}^{R} \beta_i |u_2^{(i)}\rangle_I \otimes |u_3^{(i)}\rangle_I$.

In a step S60, a quantum phase estimation on the clock register C is performed, preferably using the quantum phase estimation algorithm proposed in "Kitaev". The resulting state after phase estimation reads $\sum_{i=1}^{R} \beta_i |\lambda_i\rangle_C \otimes |u_2^{(i)}\rangle_I \otimes |u_3^{(i)}\rangle_I$, where $$\lambda_i := \frac{2\pi}{\tilde{\sigma}_i^2}.$$

In fact, it can be shown that the probability amplitude of measuring the register C is maximized when $$k\Delta t = \left\lfloor \frac{2\pi}{\tilde{\sigma}_i^2} \right\rceil,$$

where $\lfloor \cdot \rceil$ represents the nearest integer. Therefore, the small time step $\Delta t$ determines the accuracy of quantum phase estimation. We may choose $$\Delta t = O\left(\frac{1}{\epsilon}\right),$$

and the total run time is $$O\left(\frac{1}{\epsilon^3} T_{\tilde{\rho}}\right) = O\left(\frac{1}{\epsilon^3} \text{polylog}(d_1 d_2 d_3)\right)$$

according to Eq. (6) and Eq. (7).

In a step S70, a computation on the clock register C is performed to recover the original singular values of $\rho_{\hat{\chi}^\dagger\hat{\chi}}$, and obtain $$\sum_{i=1}^{R} \beta_i |\sigma_i^2\rangle_C \otimes |u_2^{(i)}\rangle_I \otimes |u_3^{(i)}\rangle_I.$$

For example, in this step S70 the $\lambda_i$ stored in the clock register C may be transferred to $\sigma_i^2$, $\lambda_i$ being a function of $\sigma_i^2$. The threshold operations discussed in the following as applied to the $\sigma_i^2$ may therefore also be, in an alternative formulation, be applied to the $\lambda_i$, with the threshold $\tau$ being appropriately rescaled.

In a step S90, a quantum singular value projection on the quantum state obtained from the last step S70 is performed. Notice that, classically, this step corresponds to projecting $\hat{\chi}$ onto the subspace $\hat{\chi}_{|\bullet|\geq\tau}$. In this way, observed entries will be smoothed and unobserved entries get boosted from which we can infer unobserved triples (s, p, ?) in the test dataset (see Theorem 2).

Quantum singular value projection given the threshold $\tau>0$ can be implemented in the following way. Therefore, in a step S80, a new auxiliary register R is created on the quantum computing device 200 using an auxiliary qubit and a unitary operation that maps $|\sigma_i^2\rangle_C \otimes |0\rangle_R$ to $|\sigma_i^2\rangle_C \otimes |1\rangle_R$ only if $\sigma_i^2 < \tau^2$, otherwise $|0\rangle^R$ remains unchanged. This step of projection gives the state $$\sum_{i:\sigma_i^2 \geq \tau^2} \beta_i |\sigma_i^2\rangle_C \otimes |u_2^{(i)}\rangle_I \otimes |u_3^{(i)}\rangle_I \otimes |0\rangle_R + \quad (9)$$

$$\sum_{i:\sigma_i^2 < \tau^2} \beta_i |\sigma_i^2\rangle_C \otimes |u_2^{(i)}\rangle_I \otimes |u_3^{(i)}\rangle_I \otimes |0\rangle_R.$$

In other words, the step S90 means performing, on the result of the computation S70 to recover the singular values, a singular value projection conditioned on the state of the auxiliary register, R, such that eigenstates whose squared singular values are to one side of (here: smaller than) the squared cutoff threshold, $\tau^2$, are entangled with a first eigenstate $|1\rangle_R$ of the auxiliary register, R, and such that eigenstates whose squared values are to another side of (here: larger than) the squared cutoff threshold, $\tau^2$, or equal to the squared cutoff threshold, $\tau^2$, are entangled with the second eigenstate $|0\rangle_R$ of the auxiliary register, R.

One of the major advantages here is that not the individual singular values are used in any decisions but only their squares. This means that possible negative singular values which may occur in the case of tensors (unlike in the case of matrices) do not have any negative impact on the present method.

In a step S100, the new register R is measured and post-selected on the state $|0\rangle_R$. This gives the projected state $$\sum_{i:\sigma_i^2 \geq \tau^2} \beta_i |\sigma_i^2\rangle_C \otimes |u_2^{(i)}\rangle_I \otimes |u_3^{(i)}\rangle_I$$

In a step S110, the clock register C is traced out such that the following equation is obtained:

$$\sum_{i:\sigma_i^2 \geq \tau^2} \beta_i |u_2^{(i)}\rangle_I \otimes |u_3^{(i)}\rangle_I.$$

The tracing out may be performed e.g. as has been described in "Nielsen et al.".

In a step S120, the resulting quantum state from the last step S110 is measured in the canonical basis of the input register I to get the triples with subject s.

In a step S130, they are post-selected on the predicate p. This will return objects to the inference (s, p, ?) after $$O\left(\frac{1}{\epsilon^3} \text{polylog}(d_1 d_2 d_3)\right)$$

steps.

The quantum algorithm is summarized also in the following table Algorithm 1.

---

Algorithm 1 Quantum Tensor SVD on KGs

Input: Inference task (s, p, ?)

Output: Possible objects to the inference task

Require: Quantum access to $\hat{\chi}$ stored in a classical memory structure; threshold $\tau$ for the singular value projection 1: Create $\rho_{\hat{x}^\dagger \hat{x}}$ via qRAM 2: Create state $|\hat{\chi}_s^{(1)}\rangle_I$ on the input data register I via qRAM 3: Prepare unitary operator U and apply on $|\hat{\chi}_s^{(1)}\rangle_I$, where $$U := \sum_{k=0}^{K-1} |k\Delta t\rangle \langle k\Delta t|_C \exp(-ik\Delta t \tilde{\rho}_{\hat{x}^\dagger \hat{x}})$$

4: Quantum phase estimation on the clock register C to obtain $\Sigma_{i=1}^R \beta_i |\lambda_i\rangle_C \otimes |u_2^{(i)}\rangle_I \otimes |u_3^{(i)}\rangle_I$ 5: Controlled computation on the clock register C to obtain $\Sigma_{i=1}^R \beta_i |\sigma_i^2\rangle_C \otimes |u_2^{(i)}\rangle_I \otimes |u_3^{(i)}\rangle_I$ 6: Singular value projection given the threshold $\tau$ to obtain $$\sum_{i:\sigma_i^2 \geq \tau^2} \beta_i |\sigma_i^2\rangle_C \otimes |u_2^{(i)}\rangle_I \otimes |u_3^{(i)}\rangle_I \otimes |0\rangle_R + \sum_{i:\sigma_i^2 < \tau^2} \beta_i |\sigma_i^2\rangle_C \otimes |u_2^{(i)}\rangle_I \otimes |u_3^{(i)}\rangle_I \otimes |1\rangle_R$$

7: Measure on the register R and post-select the state $|0\rangle_R$

8: Trace out the clock register C

9: Measure the resulting state $\sum_{i:|\sigma_i| \geq \tau} \beta_i |u_2^{(i)}\rangle_I \otimes |u_3^{(i)}\rangle_I$ in the canonical basis of the the input register I 10: Post-select on the predicate p from the sampled triples (s, ., .)

One of the main advantages of the present invention is that a method for implementing implicit knowledge inference from tensorized data, e.g., relational databases such as knowledge graphs, on quantum computing devices is proposed.

The present method shows that knowledge inference from tensorized data can be implemented with exponential acceleration on quantum computing devices. Compared to classical systems, this is, as has been shown, much faster and thus less resource-consuming than classical methods.

We also test the classical part of our method, namely the tensor singular value decomposition, on a classical devices since due to technical challenges current quantum devices only have a few universal physical qubits. The simulation results show comparable results to other benchmarking algorithms, which ensures the performance of implementing the quantum τSVD on future quantum computers.

The acceleration is given by the intrinsic parallel computing of quantum computing devices as described in the foregoing which, however, is only made applicable by the specific technical implementation of the present invention.

In some sense, the present method is based on finding the corresponding quantum counterpart of classical tensor singular value decomposition method. To show that tensor singular value decomposition has comparable performance with other classical algorithms, the present method is verified by investigating the performance of classical tensor SVD on benchmark datasets: Kinship and FB15k-237, see e.g. the scientific publication by Kristina Toutanova and Danqi Chen, "Observed versus latent features for knowledge base and text inference.", in: Proceedings of the 3rd Workshop on Continuous Vector Space Models and their Compositionality, pages 57-66, 2015.

Given a semantic triple (s, p, o), the value function of τSVD is defined as $$\eta_{spo} = \sum_{i=1}^{R} \sigma_i u_s^{(i)} u_p^{(i)} u_o^{(i)},$$

where $u_s$, $u_p$, $u_o$ are vector representations of s, p, o, respectively. The τSVD is trained by minimizing the objective function $$\mathcal{L} := \frac{1}{|\mathcal{D}_{train}|} \sum_{(s,p,o) \in \mathcal{D}_{train}} (y_{spo} - \eta_{spo})^2 +$$
$$\gamma \left( \|U_s^T U_s - \mathbb{1}_R\|_F + \|U_p^T U_p - \mathbb{1}_R\|_F + \|U_o^T U_o - \mathbb{1}_R\|_F \right)$$

via stochastic gradient descent. The hyper-parameter γ is used to encourage the orthonormality of embedding matrices for subjects, predicates, and objects.
in the following Table 1, the performance of tensor SVD model with other benchmark models,
e.g., RESCAL (proposed in Maximilian Nickel, Volker Tresp, and Hans-Peter Kriegel, "A three-way model for collective learning on multi-relational data", in: ICML, volume 11, pages 809-816, 2011), Tucker (L. R. Tucker, "Some mathematical notes on three-mode factor analysis", Psychometrika, September 1966, Vol. 31, Issue 3, pp. 279-311), and ComplEx (Théo Trouillon, Johannes Welbl, Sebastian Riedel, Éric Gaussier, and Guillaume Bouchard, "Complex embeddings for simple link prediction", in: International Conference on Machine Learning, pages 2071-2080, 2016) are shown.

Figure 3:
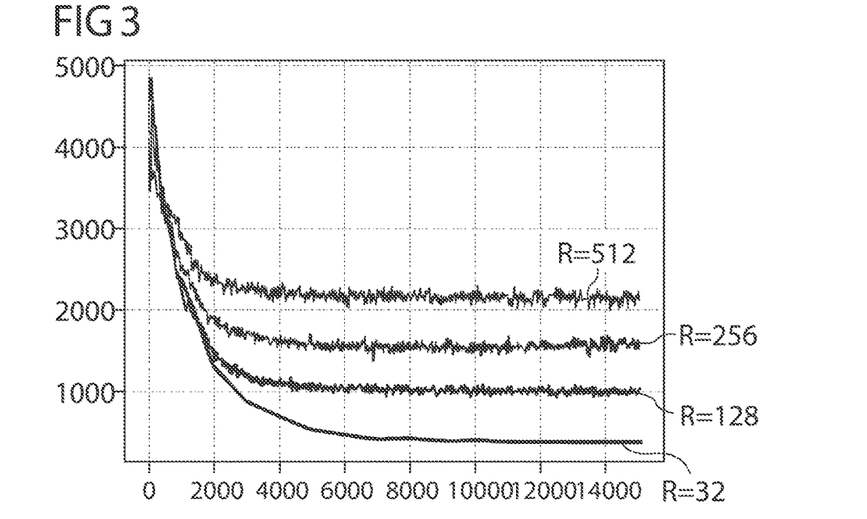
FIG. 3 shows results of measurements of the performance of the present method.
Figure 4:
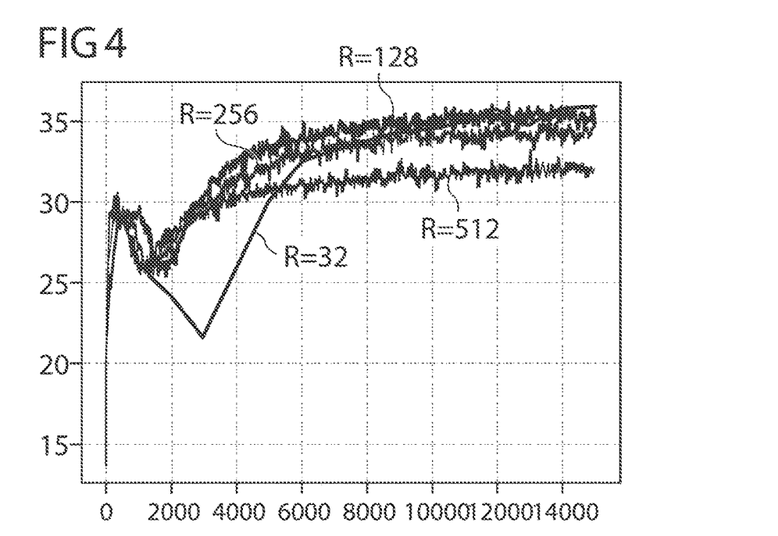
FIG. 4 shows results of measurement of the present method.

FIG. 3 and FIG. 4 show the training curves of the TSVD on FB1K-237. It shows that τSVD performs reasonably well for small rank, hence we can estimate the projection threshold τ according to the Theorem 2.

TABLE 1

Mean Rank, Hits@3, Hits@10 scores of various models compared on the Kinship and FB15k-237 datasets.

| | KINSHIP | | | FB15K-237 | | |
|---|---|---|---|---|---|---|
| Methods | MR | @3 | @10 | MR | @3 | @10 |
| RESCAL | 3.2 | 88.8 | 95.5 | 291.3 | 20.7 | 35.1 |
| TUCKER | 2.9 | 89.8 | 95.0 | 276.1 | 20.9 | 35.7 |
| COMPLEX | 2.2 | 90.0 | 97.7 | 242.7 | 25.2 | 39.7 |
| TSVD | 2.7 | 84.8 | 96.6 | 365.5 | 19.4 | 35.8 |

FIG. 3 shows the mean rank over epochs for rank values R=32, R=128; R=258 and R=512.

FIG. 4 shows the Hits@10 scores over epochs for rank values R=32, R=128; R=258 and R=512.

Noisy intermediate-scale quantum processing units (or: quantum computing devices) are expected to be commercially available in the near future. With the help of these quantum computing devices and the present method, learning and inference on the ever-increasing industrial knowledge graphs can be dramatically accelerated compared to conventional computers.

In short, the invention provides a computer-implemented method of performing an inference task on a knowledge graph comprising semantic triples of entities, wherein entity types are subject, object and predicate, and wherein each semantic triple comprises one of each entity type, using a quantum computing device, wherein a first entity of a first type and a second entity of a second type are given and the inference task is to infer a third entity of the third type.

By performing specific steps and choosing values according to specific prescriptions, an efficient and resource-saving method is developed that utilizes the power of quantum computing systems for inference tasks on large knowledge graphs. In particular, an advantageous value for a cutoff threshold for a cutoff based on singular values of a singular value tensor decomposition is prescribed, and a sequence of steps is developed in which only the squares of the singular values are of consequence and their signs are not.

The invention claimed is:
1. A computer-implemented method of performing an inference task on a knowledge graph comprising semantic triples of entities, wherein entity types are subject, object and predicate, and wherein each semantic triple comprises one of each entity type, using a quantum computing device, wherein a first entity of a first type and a second entity of a second type are given and the inference task is to infer a third entity of a third type, comprising at least the steps of:
   providing a query comprising the first entity and the second entity;
   modelling the knowledge graph as a partially observed tensor $\chi$ in a classical, non-transitory computer-readable memory structure;
   providing a cutoff threshold, τ;
   creating, from the partially observed tensor $\hat{\chi}$, a density operator in a quantum random access memory, qRAM, on the quantum computing device;

preparing a unitary operator, U, based on the created density operator, comprising states on a clock register, C;

creating a first entity state $|\chi_s^{(1)}\rangle$ indicating the first entity on an input data register of the qRAM, wherein the first entity state is entangled with a maximally entangled clock register;

applying the prepared unitary operator to at least the first entity state;

performing thereafter a quantum phase estimation on the clock register, C;

performing thereafter a computation on the clock register, C, to recover singular values;

creating an auxiliary qubit in an auxiliary register, R, which is entangled with the first entity state resulting from the creating;

wherein the auxiliary register, R, has a first eigenstate $|1\rangle_R$ and a second eigenstate $|0\rangle_R$;

performing, on a result of the computation to recover the singular values, a singular value projection conditioned on the state of the auxiliary register, R, such that eigenstates whose squared singular values are to one side of the squared cutoff threshold, $\tau^2$, are entangled with the first eigenstate $|1\rangle_R$ of the auxiliary register, R, and such that eigenstates whose squared values are to another side of the squared cutoff threshold, $\tau^2$, or equal to the squared cutoff threshold, $\tau^2$, are entangled with the second eigenstate $|0\rangle_R$ of the auxiliary register, R;

measuring the auxiliary register, R, and post-selecting one of the two eigenstates $|0\rangle_R$;

tracing out the clock register, C;

measuring the result thereof in a canonical basis of the input data register, wherein the canonical basis comprises tensor products of a basis connected to the second entity type and of a basis connected to the third entity type;

post-selecting the second entity in the basis connected to the second entity type to infer the third entity.

2. The method of claim 1,
wherein the partially observed tensor $\hat{\chi}$ is obtained such that, for each entry of the partially observed tensor $\hat{\chi}$, the entry is, with a probability p:

directly proportional to a corresponding entry of a complete tensor $\chi$ modelling a complete knowledge graph; and equal to 0 with a probability of 1−p, with p being smaller than 1.

3. The method of claim 2,
wherein the cutoff threshold $\tau$ is chosen as smaller or equal to a quantity which is indirectly proportional to the probability p.

4. The method of claim 2,
wherein the probability p is chosen to be larger to or equal a maximum value out of a set of values.

5. The method of claim 4,
wherein the set of values comprises at least a value of 0.22.

6. The method of any of claim 4,
wherein the partially observed tensor $\hat{\chi}$ is expressable as a sum of the complete tensor $\chi$ and a noise tensor N, and wherein a desired value $\tilde{\in}>0$ is defined such that the Frobenius norm $\|\bullet\|_F$ of a rank-r-approximation $\mathcal{N}_r$ of the noise tensor Y is bounded such that $\|Y_r\|_F \leq \tilde{\in} \|A\|_F$, and wherein the set of values comprises at least one value that is proportional to r and indirectly proportional to $\tilde{\in}$ to the n-th power, with n integer and n≥1.

7. The method of claim 6,
wherein the set of values comprises at least one value that is proportional to r and that is indirectly proportional to the square of $\tilde{\in}$.

8. The method of claim 6,
wherein the set of values comprises at least one value that is proportional to a square root of r and that is indirectly proportional to $\tilde{\in}$.

9. The method of claim 6,
wherein the set of values comprises at least one value that is independent of r and that is indirectly proportional to the square of $\tilde{\in}$.

10. A computing system comprising a classical computing device and a quantum computing device, wherein the computing system is configured to perform the method according to claim 1.

* * * * *